United States Patent [19] [11] Patent Number: 4,510,292
Chiba et al. [45] Date of Patent: Apr. 9, 1985

[54] ETHYLENE-PROPYLENE COPOLYMERS FOR FOAMING AND PROCESS FOR PRODUCING THE SAME

[75] Inventors: Hiromasa Chiba; Kenjiro Obama; Shunji Kawazoe; Takahiro Oka; Akihiro Satoh, all of Ichiharashi, Japan

[73] Assignee: Chisso Corporation, Osaka, Japan

[21] Appl. No.: 522,013

[22] Filed: Aug. 11, 1983

[30] Foreign Application Priority Data

Aug. 24, 1982 [JP] Japan ................. 57-146592

[51] Int. Cl.³ ............................. C08F 297/08
[52] U.S. Cl. ................... 525/247; 521/144; 521/79; 521/92; 525/268; 525/323
[58] Field of Search ............ 525/323, 268, 247

[56] References Cited

U.S. PATENT DOCUMENTS 4,291,138  9/1981  Sato et al. ..................... 525/323

FOREIGN PATENT DOCUMENTS 2646189  4/1977  Fed. Rep. of Germany ...... 525/323

Primary Examiner—Wilbert J. Briggs, Sr.
Attorney, Agent, or Firm—Fred Philpitt

[57] ABSTRACT

An ethylene-propylene block copolymer capable of producing foamed shaped articles having a structure of uniform and fine foams even without adding any other resins, and a process for producing the same are provided, which copolymer consists of a propylene homopolymer portion and an ethylene-propylene (EP) copolymer portion and is characterized in that ① the former portion is obtained by polymerizing propylene at two stages so that the portion can further consist of a lower molecular weight portion and a higher molecular portion; ② between the melt flow rates of the resulting block copolymer under a specified load and five times the load, there is a specified relationship; ③ the EP copolymer portion has an ethylene content of 60 to 95% by weight based on this portion; and ④ the block copolymer has an ethylene content of 10 to 40% by weight based on the copolymer.

4 Claims, No Drawings

ETHYLENE-PROPYLENE COPOLYMERS FOR FOAMING AND PROCESS FOR PRODUCING THE SAME

BACKGROUND OF THE INVENTION

1. Field of the Invention

This invention relates to ethylene-propylene copolymers for foaming and a process for producing the same. More particularly, it relates to ethylene-propylene copolymers capable of producing foamed shaped articles having a structure of uniform and fine foams, even without adding any other resins such as polyethylene, EPR, etc.

2. Description of the Prior Art

Polypropylene is superior in the aspect of various physical characteristics such as heat resistance, chemical resistance, strengths, etc., but since the polymer has a low melt viscosity and a great temperature dependency of the melt viscosity, it has been regarded as difficult to obtain superior foamed products. In order to overcome such drawbacks of polypropylene, various processes have so far been proposed. For example, Japanese patent publication No. Sho 52-10149/1977 discloses a process of adding a high density polyethylene and an ethylene-propylene rubber to polypropylene; and Japanese patent publication No. Sho 52-22661/1977 discloses a process of adding a low density polyethylene to polypropylene. However, according to these processes, since other kinds of resins are added in a large amount, the cost becomes relatively high, and moreover, in oder to carry out uniform blending, powerful melt blending is required at the time of granulation into pellets to make it difficult to improve its productivity at low cost. Further, Japanese patent publication No. Sho 47-12864/1972 discloses a process of graft-polymerizing divinylbenzene onto polypropylene by means of radiation to improve melt viscosity, but since use of radiation is an indispensable requirement and the process takes a long time, it is difficult to regard the process as a general one. Japanese patent publication No. Sho 47-26170/1972 discloses a process of using an ethylene-propylene random copolymer, but since a random copolymer is used, it has the drawback that the high rigidity and heat resistance of polypropylene are damaged.

The present inventors have made strenuous studies in order to overcome various drawbacks of the above-mentioned prior art, and as a result have found that a block copolymer which consists of a propylene homopolymer portion and an ethylene-propylene copolymer portion; has definite differences between the molecular weights of the respective polymer portions in the molecule; and has a definite composition of ethylene and propylene, has much superior characteristics for foaming. (Note: "molecular weight" referred to herein means a weight of polymer portion or a weight of one polymer molecule.)

The object of the present invention is to provide an ethylene-propylene copolymer for foaming, as described above and a process for producing the same.

SUMMARY OF THE INVENTION

The present invention has two aspects and comprises the following items (1) to (8):

(1) A block copolymer of propylene and ethylene for foaming obtained by copolymerizing propylene with ethylene in the presence of a catalyst comprising a titanium trichloride composition and an organoaluminum compound and a molecular weight modifier, and consisting of a propylene homopolymer portion and an ethylene-propylene copolymer portion, which block copolymer is characterized in that ① said propylene homopolymer portion is obtained by polymerizing propylene at two stages so that said propylene homopolymer portion can further consist of a lower molecular weight portion and a higher molecular weight portion, relative to said propylene homopolymer portion;

② between the melt flow rate (MFR) under a load of 2.16 Kg at 230° C. of the resulting block copolymer and the melt flow rate (HMFR) thereof under a load of 10.20 Kg i.e. five times the former load at 230° C., there is a relationship $$10 \text{ g HMFR} \geq 0.922 \log \text{MRF} + 1.44 \tag{1}$$

③ said ethylene-propylene copolymer portion in said block copolymer has an ethylene content of 60 to 95% by weight based on said copolymer portion; and ④ said block copolymer has an ethylene content of 10 to 40% by weight based on said block copolymer;

(2) A copolymer according to the above item (1) wherein the proportions of said lower molecular weight portion and said higher molecular weight portion in said propylene homopolymer portion are 40 to 60% by weight and 60 to 40% by weight, respectively;

(3) A copolymer according to the item (1) wherein the molecular weight of said ethylene-propylene copolymer portion has a medium value between the molecular weights of said lower molecular weight portion and said higher molecular weight portion in said propylene homopolymer portion;

(4) A copolymer according to the item (1) wherein the intrinsic viscosity $[\eta]_H$ of said higher molecular weight portion in said propylene homopolymer portion and the intrinsic viscosity $[\eta]_L$ of said lower molecular weight portion therein have a relationship expressed by the following equation;

$$3.5 \leq [\eta]_H - [\eta]_L \leq 7.0 \tag{2}$$

(5) In a process for producing a block copolymer by copolymerizing propylene with ethylene in the presence of a catalyst comprising a titanium trichloride composition and an organoaluminum compound and a molecular weight modifier, the improvement which comprises polymerizing propylene at two steps so that the resulting propylene homopolymer portion can consist of a lower molecular weight portion and a higher molecular weight portion relative to said propylene homopolymer portion, and further copolymerizing ethylene with propylene in the presence of said propylene homopolymer portion, into a block copolymer consisting of said propylene homopolymer portion and an ethylene-propylene copolymer portion, while controlling the amounts of the respective polymer portions polymerized and the MFR and HMFR of the total polymer, so that ① between the melt flow rate (MFR) under a load of 2.16 Kg at 230° C. of the resulting block copolymer and the melt flow rate (HMFR) thereof under a load of 10.20 Kg i.e. five times the former load at 230° C., there can be a relationship log HMFR ≧ 0.922 log MFR + 1.44    (1);

② said ethylene-propylene copolymer portion in said block copolymer can have an ethylene content of 60 to 95% by weight based on said copolymer portion; and ③ said block copolymer can have an ethylene content of 10 to 40% by weight based on said block copolymer;

(6) A process according to the item 5 wherein said propylene homopolymerization is carried out so that the proportions of said lower molecular weight portion and said higher molecular weight portion can be 40 to 60% by weight and 60 to 40% by weight, respectively;

(7) A process according to the item 5 wherein propylene is polymerized with ethylene so that the molecular weight of said ethylene-propylene copolymer portion can have a medium value between the molecular weights of said lower molecular weight portion and said higher molecular portion in said propylene homopolymer portion;

(8) Process according to the item 5 wherein the intrinsic viscosity $[\eta]_H$ of said higher molecular portion in said propylene homopolymer portion and the intrinsic viscosity $[\eta]_L$ of said lower molecular weight portion therein have a relationship expressed by the following equation:

$$3.5 \leq [\eta]_H - [\eta]_L \leq 7.0 \quad (2).$$

DESCRIPTION OF THE PREFERRED EMBODIMENTS

The ethylene-propylene copolymers of the present invention are produced as follows: Propylene is first polymerized two stages in the presence of the so-called Ziegler-Natta catalyst comprising a titanium trichloride composition and an organoaluminum compound and a molecular weight modifier so that a higher molecular weight portion and a lower molecular weight portion relative to the resulting propylene homopolymer portion can be obtained. As the titanium trichloride composition, products obtained by reducing $TiCl_4$ with hydrogen, metal aluminum, an organoaluminum or the like, followed by activation according to a known method (such as milling, heat-treatment, electron acceptor or electron donor), may be used. Further, the so-called supported type catalysts obtained by having $TiCl_4$ supported on a Mg compound may also be used. As the organoaluminum compound, those expressed by the general formula $AlR_nX_{3-n}$ wherein R represents linear or branched alkyl, aryl, alkaryl or alkoxy group of 1 to 12 carbon atoms; $0 < n \leq 3$; and X represents a halogen atom may be used. As the molecular weight modifier, hydrogen may be used. The polymerization temperature is usually in the range of 20° to 100° C., preferably 40° to 85° C. If the temperature is too low, the catalyst activity is so low for practical use, while if it is too high, the amount of non-crystalline atactic polymer increases. The polymerization pressure is in the range of atmospheric pressure to 50 Kg/cm².G. The polymerization time is usually in the range of 30 minutes to 15 hours. As for the polymerization form, any known form of slurry polymerization carried out in a solvent such as propylene monomer, hexane, heptane, etc., gas phase polymerization carried out in the form of gas, etc. may be employed, as far as the multiple stage of the present invention is possible. At the propylene polymerization stage, ethylene or another α-olefin or a vinyl compound such as styrene, vinylcyclohexane, divinylbenzene, etc. in a small amount to such an extent that the gist of the present invention is substantially not altered. If it is aimed for the resulting copolymer to have characteristics of high rigidity and heat resistance, it is preferred not to add ethylene or an α-olefin, while if characteristics of flexibility are aimed, it is preferred to add ethylene or an α-olefin. Hereinafter a simplest case will be described where the propylene homopolymer portion is prepared at two stages where a polymer portion (A) is prepared at the first stage and a polymer portion (B) is prepared at the second stage. In the present invention, it is preferred that the ratio of the amounts of the polymer portion (A) at the first stage and the polymer portion (B) at the second stage be close to one, and concretely the proportions are in the range of 35 to 65% by weight, preferably 40 to 60% by weight, respectively, based on the total of the amounts of the portions (A) and (B). Further, the differences between the molecular weights of both the polymer portions should also be within a definite range as in the equation (2) described below. The polymerization condition therefor resides on control of the hydrogen concentration in the gas phase in the polymerization vessel. Now, if the intrinsic viscosity (in tetralin solution at 135° C.) of the higher molecular weight portion is referred to as $[\eta]_H$ and that of the lower molecular weight portion is referred to as $[\eta]_L$, the both must satisfy the following relationship:

$$3.5 \leq [\eta]_H - [\eta]_L \leq 7.0 \quad (2).$$

This relationship substantially corresponds to the physical properties of the copolymer in the aforementioned equation (1). Namely if $[\eta]_H - [\eta]_L < 3.5$, then log HMFR < 0.922 log MFR + 1.44; thus such a polymer is insufficient in the melt flow characteristics at the time of extrusion processing. Contrarily, if $[\eta]_H - [\eta]_L > 7.0$, then the difference between the molecular weights of the portion (A) and the portion (B) is excessive; thus the non-uniformity of the molecular weights inside the polypropylene particles increases so that the surface-roughening of the resulting shaped articles increases. And such result is of course not preferable. The ethylene content of the ethylene-propylene copolymer portion (C) in the block copolymer of the present invention is in the range of 60 to 95% by weight (hereinafter "% by weight" is abbreviated to "%"), preferably 70 to 90%, based on the copolymer portion. If the ethylene content is less than 60%, fine foams cannot be obtained and also the rigidity lowers. Contrarily if it exceeds 95%, the low temperature impact strength and the bending strength of the shaped articles lower. The reason is considered to consist in that the compatibility of polypropylene with polyethylene is intrinsically inferior; thus the ethylene-propylene rubber component is necessary for imparting compatibility to both the portions. The molecular weight of the ethylene-propylene copolymer portion (C) is required to fall within those of the propylene homopolymer portions (A) and (B), that is, to be equal to either one of the both or an intermediate value therebetween. If it is larger than the molecular weight of the higher molecular weight portion of the propylene homopolymer portion, its compatibility with the propylene homopolymer portion is inferior and the surface of the resulting shaped articles has projections and depressions. If it is less than the molecular weight of the lower molecular weight portion thereof, fine foams cannot be obtained, and also, in the case of slurry polymerization, the amount of soluble polymer byproduced increases; hence this is undesirable with respect of operation and economically. The intrinsic viscosity $[\eta]_C$ of the ethylene-propylene copolymer portion (C) is usually in the range of about 2 to 10. The ethylene content in the final polymer is in the range of 10 to 40%, preferably 15 to 30%. If is is less than 10%, it is difficult to obtain fine foams, while if it exceeds 40%, the rigidity and heat resistance characteristic of polypropylene lower. Further, if the proportion of the ethylene-propylene copolymer portion to the total polymer exceeds 40%, the melt flow characteristics at the time of molding processing lower. The MFR values of the final products may be in the range where they are usually used for foaming, that is, in the range of 0.1 to 20. The foaming method wherein the copolymer of the present invention is used may be the one which has been usually employed for polypropylene, and has no particular limitation. Examples of the method are a method of melt-plasticizing polypropylene, forcing a swelling agent such as a gas, a volatile liquid substance, etc. into the plasticized polypropylene, sufficiently blending the swelling agent with the polypropylene, and then extruding the blend into a low pressure zone while cooling it, that is, a method referred to generally as "gas foaming method"; a method of blending a substance which, when heated, generates decomposition gas (a chemical foaming agent), with a polypropylene raw material, melt-plasticizing and kneading the blend by means of an extruder, and then extruding it into a low pressure zone, that is, a method referred to generally as "chemical foaming agent method"; etc. Examples of the swelling agents used in the gas foaming method are trichloromonofluoromethan, dichloromonofluoromethane, dichlorodifluoromethane, trichlorotrifluoroethane, methyl chloride, $CO_2$ gas, etc. Examples of the foaming agent used in the chemical foaming agent method are azodicarbonamide, dinitropentamethylenetetramine, azodicarbamic acid amide, 4,4'-oxybisbenzenesulfonyl hydrazide, etc.

The polypropylene copolymer of the present invention can be used not only for producing foamed products by means of an extruder, but also for molding such as injection molding. Further, in order to impart a specified property to the copolymer, a thermoplastic resin may be blended therewith, such as low density polyethylene (LDPE), high density polyethylene (HDPE), ethylene-propylene rubber (EPR), block copolymers of styrene with butadiene or isoprene, etc. Further, in the case of general foaming molding, finely-ground inert substances such as talc, silica, calcium carbonate, aluminum hydroxide, etc. are often added in a small amount as a foaming auxiliary, and in the present invention, these auxiliaries are also effective. Still further, a pigment may be added to the polypropylene copolymer of the present invention for coloring it.

As described above, the present invention can provide a propylene copolymer for foaming which is superior in the appearance characteristics, has fine foams uniformly dispersed therein, superior in the mechanical strengths and superior in the melt-fluidity at the time of molding processing, even though no other resins such as polyethylene, EPR, etc. are added to the copolymer.

The present invention will be further concretely described by way of Examples.

As for the methods for measuring the values of physical properties in Examples of the present invention, the following methods were employed:

(1) Melt flow rate (MFR): JIS K 6758 (230° C., 2.16 kg·f load)

(2) Melt flow rate (HMFR): JIS K 6758 (230° C., 10.2 Kg·f load)

(3) Intrinsic viscosity $[\eta]$: measured in tetralin at 135° C.

In this case, the intrinsic viscosities of the polymer portions at the second stage and the third stage, $[\eta]_2$ and $[\eta]_3$, were calculated from the following equation:

$$[\eta]_{1.2} = \frac{a}{a+b}[\eta]_1 + \frac{b}{a+b}[\eta]_2 \quad (3)$$

$[\eta]_{1.2}$: Intrinsic viscosity of polymer formed throughout the first stage and the second stage (measurable by way of sampling).

$[\eta]_1$: Intrinsic viscosity of polymer formed at the first stage (measurable by means of sampling).

$[\eta]_2$ Intrinsic viscosity of polymer formed at the second stage (calculated from the equation (3)).

$a$: Amount polymerized at the first stage  
$b$: Amount polymerized at the second stage  
⎫ Calculated from the analytical values of Ti component by way of fluorescent X-ray of mass balance polymer.

$$[\eta]_{1.2.3} = \frac{a+b}{a+b+c}[\eta]_{12} + \frac{c}{a+b+c}[\eta]_3 \quad (4)$$

$[\eta]_{1.2.3}$: Intrinsic viscosity of total polymer formed throughout the first, second and third stages (measurable).

$[\eta]_3$: Intrinsic viscosity of polymer formed at the third stage (calculated from the equation (4)).

c: Amount polymerized at the third stage (sought by way of fluorescent X-ray method).

(4) Ethylene content: Sought by way of IR method.

EXAMPLE 1

(1) Preparation of catalyst n-Hexane (600 ml), diethylaluminum monochloride (DEAC) (0.50 mol) and diisoamyl ether (1.20 mol) were mixed at 25° C. for one minute and reacted at the same temperature for 5 minutes to obtain a reaction liquid (VI) (mol ratio of diisoamyl ether/DEAC: 2.4). $TiCl_4$ (4.0 mols) was placed in a nitrogen gas-purged reactor and heated to 35° C. The total amount of the above-mentioned reaction liquid (VI) was dropwise added to the $TiCl_4$ over 180 minutes, followed by keeping the mixture at the same temperature for 30 minutes, raising the temperature up to 75° C., further reacting it for one hour, cooling down to room temperature, removing the supernatant, 4 times repeating a procedure of adding n-hexane (4,000 ml) and removing the supernatant by decantation to obtain a solid product (II) (190 g). The total amount of this product (II) was then suspended in n-hexane (3,000 ml), and to this suspension were added diisoamyl ether (160 g) and $TiCl_4$ (350 g) at 20° C. over about one minute, followed by reaction at 65° C. for one hour. After completion of the reaction, the reaction liquid was cooled down to room temperature (20° C.), followed by removing the supernatant by decantation, five times repeating a procedure of adding n-hexane (4,000 ml), agitating the mixture for ten minutes, and allowing it to still stand, and drying under reduced pressure to obtain a solid product (III).

(2) Preparation of preactivated catalyst

Into a 20 l capacity stainless reactor equipped with slant blades, and purged with nitrogen gas were added n-hexane (15 l), diethylaluminum monochloride (42 g) and the solid product (III) (30 g) at room temperature, followed by introducing hydrogen (15 Nl), reacting propylene under a propylene partial pressure of 5 Kg/cm²G for 5 minutes, and removing unreacted propylene, hydrogen and n-hexane under reduced pressure to obtain a preactivated catalyst (VII) in the form of powder (propylene reacted per g of the solid product (III): 82.0 g).

(3) Propylene polymerization

Into a 250 l capacity stainless polymerization vessel equipped with turbine type agitating blades, and purged with nitrogen gas were fed n-hexane (100 l), then diethylaluminum monochloride (10 g), the above-mentioned preactivated catalyst (VII) (7 g) and methyl p-toluylate (0.5 g), and further, hydrogen was added, followed by raising the temperature up to 70° C., then feeding propylene, raising the total pressure up to 10 Kg/cm²G, and carrying out a first stage polymerization at 70° C. in a gas phase hydrogen concentration of 0.3% by mol. When the amount of propylene polymerized reached 15 Kg, the temperature inside the vessel was lowered down to room temperature to once stop the polymerization, followed by withdrawing a portion of the polymerization slurry as a sample for carrying out the measurement of $[\eta]_1$ and the analysis of Ti content in the polymer according to fluorescent X-ray method, to thereby calculate the polymer yield per unit weight of the catalyst. The temperature was again raised up to 70° C. and hydrogen was fed into the polymerization vessel, followed by carrying out a second stage polymerization, while keeping the polymerization pressure at 10 Kg/cm²G and the gas phase hydrogen concentration at 12% by mol. When the amount polymerized at the second stage reached 15 Kg, the propylene feed was stopped, the temperature inside the vessel was lowered down to room temperature, and hydrogen and unreacted propylene were released. A portion of the polymerization slurry was then withdrawn as a sample for carrying out the measurement of $[\eta]_{1.2}$ and the analysis of Ti content according to fluorescent X-ray method. The temperature inside the polymerization vessel was again raised and ethylene and propylene were continuously fed for 3 hours at 60° C. and 0.1 Kg/cm²G while the proportion of ethylene to ethylene plus propylene fed was kept at 85% by weight. The total amount of ethylene fed was 12.5 Kg, and during the polymerization, hydrogen was fed so as to give a gas phase hydrogen concentration of 25% by mol. After the polymerization for 3 hours, the feed of ethylene and propylene was stopped and unreacted ethylene and propylene were released. A portion of the polymerization slurry was then withdrawn, and the measurement of $[\eta]_{1.2.3}$ and the analysis of Ti content in the polymer according to fluorescent X-ray method were carried out to calculate the polymer yield per unit weight of the catalyst and further calculate the yields, proportions and $[\eta]$s at the respective stages, by the use of the above-mentioned polymer yields at the first and second stages. To the above-mentioned polymerization slurry after withdrawn was added methanol (20 l), followed by agitating the mixture at 75° C. for 30 minutes, adding a 20% aqueous solution of NaOH (200 ml), further subjecting the mixture to agitation treatment for 20 minutes, cooling the thus treated material down to room temperature, adding water (30 l), three times carrying out washing and separation, filtering the resulting slurry and drying to obtain white powder of polymer. The analytical results of the polymer are shown in Table 1.

(4) Foaming test

A heat stabilizer was added to the above-mentioned powder of polymer, followed by granulating the mixture, further adding 1.0% by weight of talc having a particle size of 1μ as a foaming auxiliary, uniformly blending the mixture by means of a Henschel mixer (Trade name), feeding the blend into a first extruder (barrel diameter: 40φ, L/D=28), continuously feeding the resin melt melt-kneaded at a barrel temperature of 180°~230° C. into a second extruder (barrel diameter: 60φ, L/D=30) set to a barrel temperature of 160°~170° C., forcing dichlorodifluoromethane into the barrel through a foaming gas-injecting port fixed to a location of ⅔ of the length of the barrel from the resin-feeding side, in a proportion of 20 parts by weight of $CCl_2F_2$ to 100 parts by weight of the resin melt, allowing them to be uniformly mixed and $CCl_2F_2$ to be uniformly dispersed in the resin, feeding the kneaded material into a die set to 155° C., and extruding it through a die nozzle onto rolls in the atmosphere, while keeping the resin pressure in the die at 60 Kg/cm²G, to foam the resin. The results are shown in Table 1, and as seen therefrom, the polymer of the present invention has a smooth foamed surface, a high foaming ratio and a high bending strength.

EXAMPLES 2 AND 3

Example 1 was repeated except that in Examples 2 and 3, the first stage hydrogen concentrations were made 0.1 and 0.03% by mol, respectively, the second stage ones were made 14 and 16% by mol, respectively and the third stage ones were both made 27% by mol. The results are shown in Table 1.

COMPARATIVE EXAMPLE 1

Example 1 was repeated except that the amount of propylene reacted at the first stage was made 30 Kg and the hydrogen concentration at the stage was made 1.4% by mol; the second stage was omitted; and the hydrogen concentration at the third stage was made 27% by mol. The results are shown in Table 1.

COMPARATIVE EXAMPLES 2 AND 3

Example 1 was repeated except that in Comparative examples 2 and 3, the hydrogen concentrations at the first stage were made 0.4 and 0.02% by mol, respectively, and the amounts of propylene reacted at the stage were made 15 and 12 Kg, respectively; and the hydrogen concentrations at the second stage were made 3.5 and 23% by mol, respectively and the amounts of propylene reacted at the stage were made 15 and 18 Kg, respectively. The results are shown in Table 1.

If the value of log HMFR−0.922 log MFR is less than 1.44 as in comparative examples 1 and 2, it is seen that the proportion of closed foams lowers, the foaming ratio also lowers and wrinkles are formed on the surface of the resulting shaped articles; hence such a case is undesirable. Further, if the difference between the $[\eta]_H$ of the higher molecular weight portion and the $[\eta]_L$ of the lower molecular weight portion exceeds 7.0, as in Comparative example 3, the projections and depressions on the surface of shaped articles increase to make the surface non-uniform; hence such a case is also undesirable.

COMPARATIVE EXAMPLE 4

Example 1 was repeated except that at the first stage, the hydrogen concentration and the amount of propylene reacted were made 0.3% by mol and 12 Kg, respectively; at the second stage, the hydrogen concentration and the amount of propylene reacted were made 16% by mol and 18 Kg, respectively; and at the third stage, the hydrogen concentration and the amount of ethylene fed were made 6% by mol and 7.5 Kg, respectively. The results are shown in Table 1. If the $[\eta]_3$ at the third stage is made greater than those at the first and second stages, the foaming ratio is low and also the appearance of shaped articles has increased projections and depressions and hence becomes inferior.

COMPARATIVE EXAMPLE 5

Comparative example 4 was repeated except that the hydrogen concentrations at the first, second and third stages were made 0.2, 2.0 and 60% by mol, respectively. If the $[\eta]$ at the third stage is made lower than those at the first and second stages, wrinkles are formed on the surface of shaped articles as seen in Table 1, and also the foaming ratio is low; hence it is impossible to obtain superior foamed products.

EXAMPLES 4 AND 5

Example 1 was repeated except that at the first stage, the hydrogen concentration was made 0.2 and 0.15% by mol in the order of Examples 4 and 5 (this order applies to the following); at the second stage, the hydrogen concentration was made 14 and 13% by mol; and at the third stage, the hydrogen concentration was made 17 and 35% by mol, and ethylene was fed in amounts of 7.5 and 15 Kg, and in proportions of 55 and 80% by weight to the total amounts of ethylene and propylene. The results are shown in Table 1.

COMPARATIVE EXAMPLES 6 AND 7

Example 1 was repeated except that at the first stage, the hydrogen concentration was made 0.15 and 0.06% by mol in the order of Examples 6 and 7 (this order applies to the following); at the second stage, the hydrogen concentration was made 11 and 7.5% by mol; and at the third stage, the hydrogen concentration was made 20 and 27% by mol and ethylene was fed in amounts of 3.5 and 30 Kg. When the ethylene content in the polymer is outside the range of the present invention, superior foamed products cannot be obtained.

EXAMPLE 6 AND COMPARATIVE EXAMPLES 8 AND 9

Example 1 was repeated except that at the first stage, the hydrogen concentration was made 0.2, 0.2 and 0.6% by mol in the order of Example 6 and Comparative examples 8 and 9 (this order applies to the following); at the second stage, the hydrogen concentration was made 9, 9 and 12% by mol; and at the third stage, the hydrogen concentration was made 9, 7 and 16% by mol and ethylene was fed in amounts of 9, 12 and 8 Kg in proportions of 40, 20 and 100% by weight to the total amounts of ethylene and propylene. When the proportion of ethylene fed to the total amounts of ethylene and propylene at the third stage was small, the amount of closed foams was small, the foaming ratio was low, and wrinkles were formed on the surface. Contrarily when ethylene alone was fed, particularly the bending strength lowered.

COMPARATIVE EXAMPLES 10 AND 11

Example 1 was repeated except that at the first stage, the hydrogen concentration was made 0.06 and 0.5% by mol and the amount of propylene reacted was made 9 and 22 Kg; at the second stage, the hydrogen concentration was made 7 and 17% by mol and the amount of propylene reacted was made 22 and 10 Kg; and at the third stage, the hydrogen concentration was made 25 and 30% by mol. The results are shown in Table 2. When the ratio of the amounts reacted at the first and second stages is outside the range of the present invention, the foaming ratio is low and wrinkles are formed.

EXAMPLE 7

Example 1 was repeated except that the hydrogen concentrations at the first, second and third stages were made 0.03, 9 and 20% by mol, respectively and the amount of ethylene fed at the third stage was made 8 Kg. The results are shown in Table 2. It is seen that even when the order of preparing the higher molecular weight portion and the lower one is reversed, there occurs no difference.

TABLE 1

|  |  |  | Example 1 | Example 2 | Example 3 | Compar. ex. 1 | Compar. ex. 2 | Compar. ex. 3 | Compar. ex. 4 | Compar. ex. 5 |
|---|---|---|---|---|---|---|---|---|---|---|
| First stage | $[\eta]_1$ | dl/g | 5.36 | 6.34 | 7.75 | 3.58 | 4.89 | 8.71 | 5.31 | 5.44 |
|  | Polymerization proportion | wt. % | 38 | 35 | 33 | 74 | 37 | 30 | 33 | 32 |
| Second stage | $[\eta]_2$ | dl/g | 1.13 | 0.99 | 0.88 |  | 2.44 | 0.59 | 0.91 | 1.42 |
|  | Polymerization proportion | wt. % | 34 | 37 | 38 |  | 35 | 41 | 49 | 48 |
| Third stage | $[\eta]_3$ | dl/g | 3.65 | 3.31 | 3.45 | 3.43 | 3.43 | 3.37 | 8.45 | 10.91 |
|  | Polymerization proportion | wt. % | 28 | 25 | 29 | 26 | 28 | 29 | 18 | 20 |
|  | $C''_2/(C''_2 + C''_3)$ | wt. % | 85 | 87 | 87 | 88 | 86 | 89 | 91 | 85 |
| Total Polymer | MFR | g/10 min. | 0.72 | 0.55 | 0.35 | 0.52 | 0.46 | 0.29 | 0.38 | 0.69 |
|  | HMFR | g/10 min. | 23.5 | 24.5 | 19.5 | 10.1 | 11.0 | 16.5 | 16.7 | 26.3 |
|  | log HMFR − 0.922 log MFR |  | 1.50 | 1.63 | 1.71 | 1.26 | 1.35 | 1.71 | 1.61 | 1.57 |
|  | $C''_2$ % | wt. % | 24 | 22 | 25 | 23 | 24 | 26 | 16 | 17 |
|  | $[\eta]_2 − [\eta]_1$ | dl/g | 4.23 | 5.35 | 6.87 | — | 2.45 | 8.12 | 4.40 | 4.02 |
| Foaming ratio |  |  | 21 | 22 | 24 | 14 | 16 | 20 | 16 | 14 |
| Average diameter of foams (mm) |  |  | 1.0 | 0.9 | 0.7 | 1.3 | 1.2 | 1.0 | 1.3 | 1.4 |
| Condition of foamed cell |  |  | ca. 87% closed | ca. 90% closed | ca. 92% closed | ca. 70% closed | ca. 78% closed | ca. 86% closed | ca. 67% closed | ca. 65% closed |
| Resistance when bent double |  |  | not broken | → | → | → | → | → | broken | → |

TABLE 1-continued

| Surface of foamed product | o smooth | o smooth | o smooth | x wrinkles formed | Δ wrinkles formed | x Number of projections and depressions is large | x Number of projections and depressions is large | x wrinkles formed |
| --- | --- | --- | --- | --- | --- | --- | --- | --- |
| | | | Example 4 | Example 5 | Compar. ex. 6 | Compar. ex. 7 | Example 6 | Compar. ex. 8 | Compar. ex. 9 |

| | | | Example 4 | Example 5 | Compar. ex. 6 | Compar. ex. 7 | Example 6 | Compar. ex. 8 | Compar. ex. 9 |
| --- | --- | --- | --- | --- | --- | --- | --- | --- | --- |
| First stage | $[\eta]_1$ | dl/g | 5.76 | 6.25 | 6.12 | 6.29 | 5.83 | 5.47 | 5.96 |
| | Polymerization proportion | wt. % | 36 | 35 | 44 | 22 | 33 | 34 | 40 |
| Second stage | $[\eta]_2$ | dl/g | 0.98 | 1.02 | 1.14 | 1.54 | 1.17 | 1.21 | 1.04 |
| | Polymerization proportion | Wt. % | 44 | 32 | 48 | 22 | 42 | 34 | 44 |
| Third stage | $[\eta]_3$ | dl/g | 4.17 | 2.98 | 4.20 | 3.57 | 4.70 | 3.74 | 4.59 |
| | Polymerization proportion | wt. % | 20 | 30 | 8 | 54 | 25 | 32 | 16 |
| | $C''_2/(C''_2 + C''_3)$ | wt. % | 74 | 92 | 86 | 87 | 65 | 46 | 100 |
| Total polymer | MFR | g/10 min. | 0.77 | 0.69 | 0.59 | 0.42 | 0.57 | 0.64 | 0.51 |
| | HMFR | g/10 min. | 34.0 | 29.6 | 24.8 | 12.5 | 21.3 | 22.5 | 24.1 |
| | log HMFR − 0.922 log MFR | | 1.64 | 1.62 | 1.62 | 1.45 | 1.55 | 1.53 | 1.66 |
| | $C''_2$ % | wt. % | 15 | 30 | 17 | 47 | 16 | 15 | 16 |
| | $[\eta]_2 - [\eta]_1$ | dl/g | 4.78 | 5.23 | 4.98 | 4.75 | 4.66 | 4.26 | 4.92 |
| Foaming ratio | | | 19 | 23 | 13 | 17 | 18 | 14 | 18 |
| Average diameter of foams (mm) | | | 1.0 | 0.80 | 1.3 | 1.2 | 0.9 | 1.2 | 1.0 |
| Condition of foamed cell | | | ca. 84% closed | ca. 93% closed | ca. 75% closed | ca. 80% closed | ca. 83% closed | ca. 73% closed | ca. 82% closed |
| Resistance when bent double | | | not broken | → | broken | not broken | → | → | broken |
| Surface of foamed product | | | o smooth | o smooth | x wrinkles formed | Δ wrinkles formed | o smooth | Δ wrinkles formed | o smooth |

TABLE 2

| | | | Compar. ex. 10 | Compar. ex. 11 | Example 7 |
| --- | --- | --- | --- | --- | --- |
| First stage | $[\eta]_1$ Polymerization proportion | dl/g wt. % | 7.24 24 | 4.64 58 | 1.30 43 |
| Second stage | $[\eta]_2$ Polymerization proportion | dl/g wt. % | 1.65 55 | 0.75 22 | 7.88 38 |
| Third stage | $[\eta]_3$ Polymerization proportion | dl/g wt. % | 3.51 21 | 2.95 20 | 4.25 19 |
| | $C''_2/(C''_2 + C''_3)$ | wt. % | 84 | 85 | 84 |
| Total polymer | MFR | g/10 min. | 0.63 | 0.59 | 0.12 |
| | HMFR | g/10 min. | 14.5 | 13.2 | 9.5 |
| | log HMFR −0.922 log MFR | | 1.35 | 1.33 | 1.83 |
| | $C''_2$ % | wt. % | 18 | 17 | 16 |
| | $[\eta]_2 - [\eta]_1$ | dl/g | 5.59 | 3.89 | 6.58 |
| Foaming ratio | | | 15 | 16 | 24 |
| Average diameter (mm) of foams | | | 1.2 | 1.1 | 0.7 |
| Condition of foamed cell | | | ca. 72% closed | ca. 74% closed | ca. 92% closed |
| Resistance when bent double | | | not broken | → | → |
| Surface of foamed product | | | Δ wrinkles formed | Δ wrinkles formed | o |

What we claim is:

1. In a process for producing a block copolymer by copolymerizing propylene with ethylene in the presence of a catalyst comprising a titanium trichloride composition and an organoaluminum compound and a molecular weight modifier, the improvement which comprises:

(a) polymerizing propylene in two steps so that the resulting propylene homopolymer portion will consist of a lower molecular weight portion and a higher molecular weight portion, the intrinsic viscosity $[\eta]_H$ of said higher molecular portion and the intrinsic viscosity $[\eta]_L$ of said lower molecular weight portion having the relationship expressed by the following equation:

$$3.5 \leq [\eta]_H - [\eta]_L \leq 7.0$$

said propylene homopolymerization is carried out so that the proportions of said lower molecular weight portion and said higher molecular weight portion are 40 to 60% and 60 to 40% by weight, respectively, (b) in a subsequent stage copolymerizing ethylene with propylene, in the presence of said propylene homopolymer portion, into a block copolymer consisting of said propylene homopolymer portion and an ethylene-propylene copolymer portion, the ethylene being polymerized with propylene so that the molecular weight of said ethylene-propylene copolymer portion will have a value between the molecular weights of said lower molecular weight portion and said higher molecular portion in said propylene homopolymer portion, and so that ethylene-propylene copolymer portion will have an ethylene content of 60–95% by weight based on said copolymer portion, and (c) controlling the amounts of the respective polymer portions polymerized and the MFR and the HMFR of the total polymer so that:
  (i) the relationship between the melt flow rate (MFR) under a load of 2.16 Kg at 230° C. of the resulting block copolymer and the melt flow rate (HMFR) of the block copolymer under a load of 10.20 Kg at 230° C. is log HMFR ≧ 0.922 log MFR + 1.44,
  (ii) said block copolymer has an ethylene content of 10 to 40% by weight.

2. A process according to claim 1 wherein the ethylene content in (b) is 70–90%.

3. A process according to claim 1 wherein the ethylene content in (ii) is 15–30%.

4. A process according to claim 1 wherein the MFR value of the final product is 0.1–20.

* * * * *